(12) United States Patent
Cheng

(10) Patent No.: US 6,507,729 B1
(45) Date of Patent: Jan. 14, 2003

(54) LUMINESCENT EXTERNAL DIALER FOR MOBILE PHONE

(75) Inventor: Chin-Hung Cheng, Chungho (TW)

(73) Assignee: Lucent Trans Electronic Company, Ltd., Taipei Hsien (TW)

( * ) Notice: Subject to any disclaimer, the term of this patent is extended or adjusted under 35 U.S.C. 154(b) by 363 days.

(21) Appl. No.: 09/631,936

(22) Filed: Aug. 3, 2000

(30) Foreign Application Priority Data

Jun. 16, 2000 (TW) .................................... 89210329 U

(51) Int. Cl.[7] ................................................ H04B 1/38
(52) U.S. Cl. ...................... 455/90; 455/566; 345/102
(58) Field of Search .................... 455/66, 575, 566, 455/90, 568; 379/454, 455; 345/70, 102, 89, 69

(56) References Cited

U.S. PATENT DOCUMENTS

| | | | |
|---|---|---|---|
| 4,917,462 A | 4/1990 | Lewis et al. ................ 350/319 |
| 5,105,305 A | 4/1992 | Betzig et al. ............... 359/368 |
| 5,148,307 A | 9/1992 | Kopelman et al. .......... 359/385 |
| 5,253,245 A | 10/1993 | Rabedeau .................... 369/119 |
| 5,334,849 A | 8/1994 | Thomas et al. ............. 250/559 |
| 5,452,285 A | 9/1995 | Monen ..................... 369/275.3 |
| 5,453,969 A | 9/1995 | Psaltis et al. ............... 369/109 |
| 5,519,679 A | 5/1996 | Gage ........................ 369/44.34 |
| 5,533,042 A | 7/1996 | Fukunaga et al. ............ 372/50 |
| 5,566,224 A * | 10/1996 | ul Azam et al. ............ 359/839 |
| 5,574,742 A | 11/1996 | Ben-Michael et al. ........ 372/45 |
| 5,608,710 A | 3/1997 | Minemura et al. .......... 369/116 |
| 5,615,050 A | 3/1997 | Kant .......................... 359/711 |
| 5,617,112 A * | 4/1997 | Yoshida et al. ............. 345/102 |
| 5,637,907 A | 6/1997 | Leedy ........................ 257/434 |
| 5,691,541 A | 11/1997 | Ceglio et al. ............. 250/492.1 |
| 5,792,674 A | 8/1998 | Kitamura ..................... 438/31 |
| 5,793,913 A | 8/1998 | Kovacic ....................... 385/49 |
| 5,847,783 A * | 12/1998 | Hiramoto et al. ........... 345/102 |
| 5,870,176 A | 2/1999 | Sweatt et al. ................ 355/53 |
| 5,881,042 A | 3/1999 | Knight ........................ 369/99 |
| 5,888,680 A | 3/1999 | Ohbayashi et al. .......... 430/19 |
| 5,909,614 A | 6/1999 | Krivoshlykov ............... 438/29 |
| 6,072,477 A * | 6/2000 | Ueno ......................... 345/211 |
| 6,148,075 A * | 11/2000 | Inubushi et al. ............ 379/368 |
| 6,230,214 B1 * | 5/2001 | Liukkonen et al. ......... 359/173 |
| 6,256,007 B1 * | 7/2001 | Walukas et al. ............. 345/102 |
| 6,346,973 B1 * | 2/2002 | Shibamoto et al. .......... 349/69 |
| 6,411,823 B1 * | 6/2002 | Chen ......................... 455/346 |

\* cited by examiner

Primary Examiner—Thanh Cong Le
Assistant Examiner—Tan Trinh
(74) Attorney, Agent, or Firm—Rabin & Berdo, P.C.

(57) ABSTRACT

A luminescent external dialer for mobile phone primary includes a main unit and an external dialer. The main unit is connected to a mobile phone and having a voice-control circuit of hand-free set and a mobile phone charger circuit while the voice-control circuit of hand-free set is connected with a microphone as well as a speaker. The external dialer consists of a microprocessor, a liquid crystal display (LCD), a brightness controller, a keyboard, a luminescent panel circuit, a photosensitive circuit, and a memory. The external dialer is attached to the main unit and the main unit is connected with the mobile phone. The external dialer is installed at easy-to-reach location for the convenience of its users. Other features beneficial to users include the larger keyboard for a better command of the mobile phone and a luminescent panel circuit for increasing the brightness when the light in the environment is insufficient.

2 Claims, 5 Drawing Sheets

LUMINESCENT EXTERNAL DIALER FOR MOBILE PHONE

BACKGROUND OF THE INVENTION

Field of the Invention

This invention relates generally to a luminescent external dialer for mobile phone and, more specifically, to a hands-free unit for mobile phone which includes a main unit and an external dialer. The main unit is connected to a mobile phone, and the external dialer is positioned in the car to allow easy operation for users. To ensure effortless operation, the external dialer is equipped with dial keys larger in size than regular ones and able to give light to the dialing pad whenever there is insufficient lighting of surroundings.

As mobile telecommunication technology rapidly develops, wireless communication devices such as mobile phones are widely used. Mobile phone users demand a high performance from a portable phone to ensure that they stay in touch while on the move. For mobile phone users who drive, especially businesspersons who constantly drive at work, safety is a great concern to them since they frequently have to talk through the mobile phone while on the road.

Heretofore, it is known to construct a mobile phone plugged with a hands-free unit, which typically contains an earphone and a clip-on microphone. Drivers put on the earphone and the microphone at standby. When receiving a call, users push the dial key to answer the call or simply wait for the phone to automatically put them through after a preset number of rings. The hands-free unit allows users to keep their hands on the wheel and their eyes on the road, which helps to decrease the risk of car accidents.

Although the heretofore known hands-free unit enhances convenience and safety for mobile phones users, users still have to take the mobile phone off the hands-free unit whenever they intend to make an outgoing call.

Furthermore, since more and more mobile phones support Wireless Application Protocol (WAP) functions, users would need to read information or messages from the screen of the mobile phone when they surf on the web. It is inconvenient for drivers to read the information or messages from the screen when the mobile phone is placed on the hands-free unit.

SUMMARY OF THE INVENTION

It is therefore a primary object of the present invention to provide an advanced hands-free unit includes a main unit and an external dialer. The main unit is connected to a mobile phone, and the external dialer is installed in a proper position inside the car to allow users to operate easily. To make operation even easier, the external dialer is made with large dial keys and gives light to the key pad whenever the lighting is insufficient.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DETAILED DESCRIPTION OF THE PREFERRED EMBODIMENT

Figure 1:
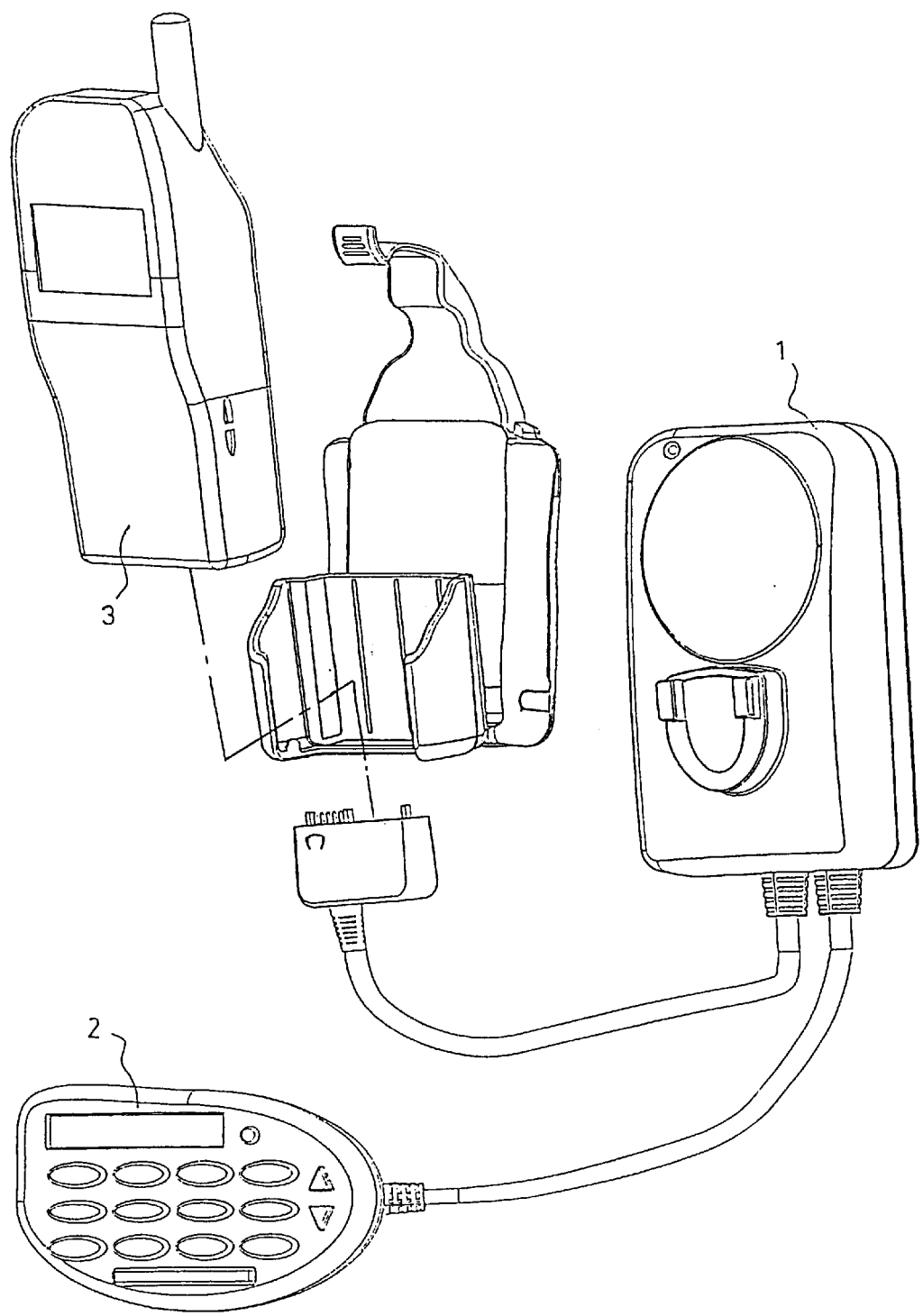
FIG. 1 is a perspective view of the present invention with a mobile phone connected to a mobile phone.
Figure 2:
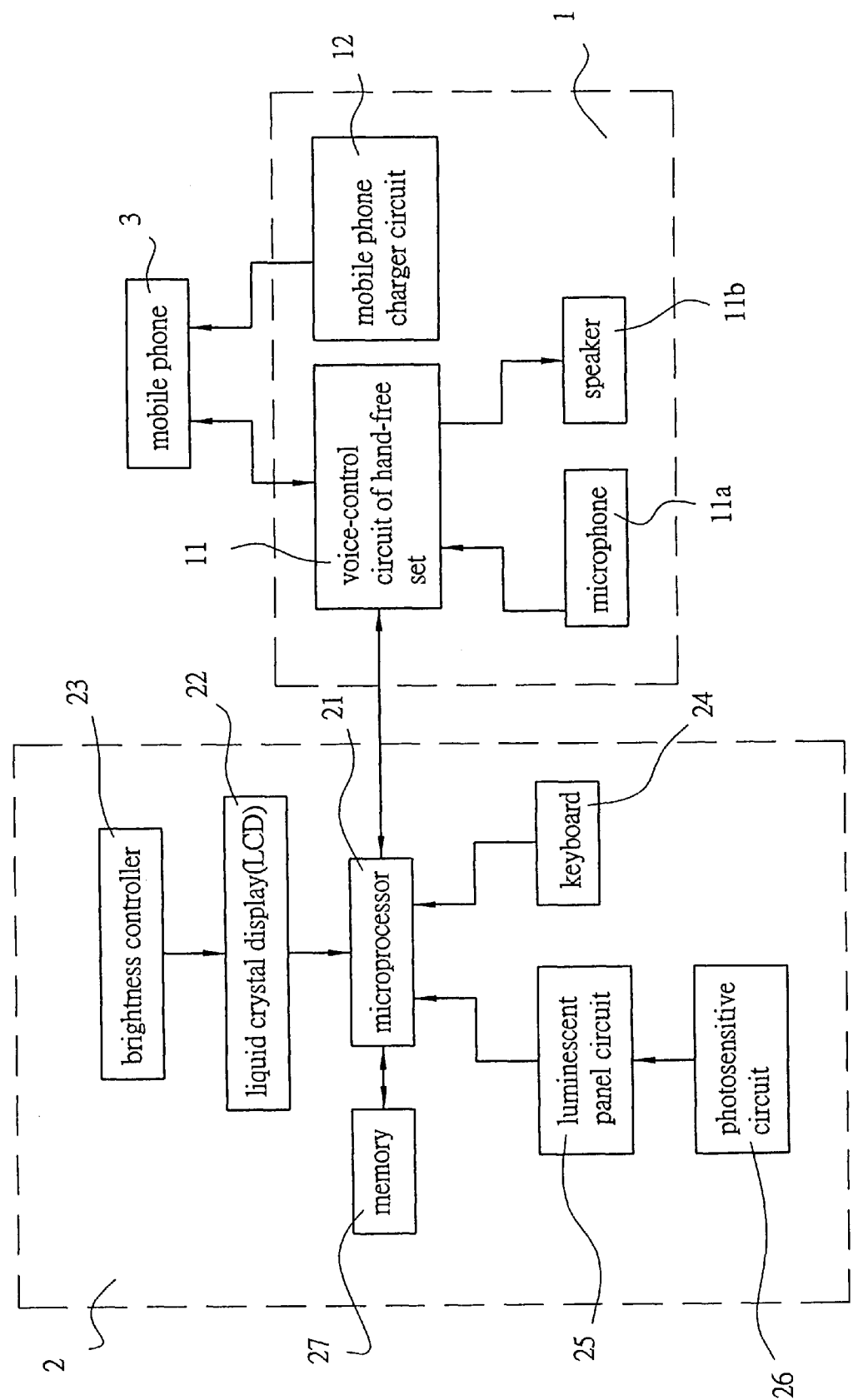
FIG. 2 is a block diagram of circuit in accordance with the present invention.
Figure 3:
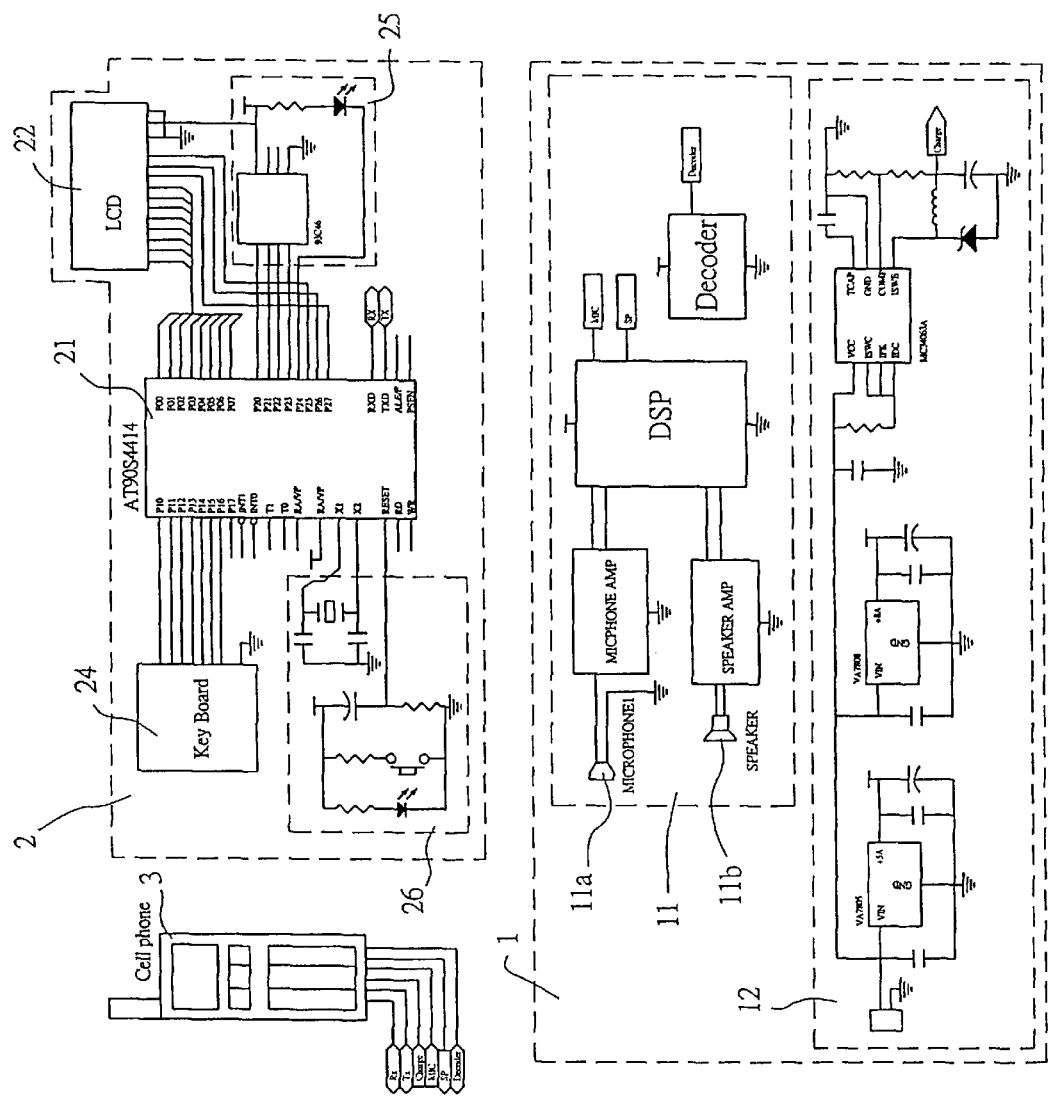
FIG. 3 is a circuit diagram in accordance with the present invention.

Refer to FIG. 1, the present invention primarily includes a main unit 1, and an external dialer 2. The correlative location and structure of each component in accordance with the present invention are as follows:

With reference to FIG. 2, the main unit 1 is connected to a mobile phone 3 and having a voice-control circuit of hand-free set 11 and a mobile phone charger circuit 12 while the voice-control circuit of hand-free set 11 is connected with a microphone 11a as well as a speaker 11b; the external dialer 2 is connected to the voice-control circuit of hand-free set 11 of the main unit 1 and having a microprocessor 21, a liquid crystal display (LCD) 22, a brightness controller 23, a keyboard 24, a luminescent panel circuit 25, a photosensitive circuit 26, and a memory 27, wherein the microprocessor 21 is used to control all internal circuits;

the LCD monitor 22 for showing signals of incoming calls or information is connected to the microprocessor 21;

the brightness controller 23 for regulating the brightness of the LCD monitor 22 is connected to the LCD monitor 22;

the keyboard 24 for inputting dial information is connected to the microprocessor 21 and transmitting the information thereto;

the luminescent panel circuit 25 for increasing the brightness when the light in the environment is insufficient is connected to the microprocessor 21;

the photosensitive circuit 26 connected to the luminescent panel circuit 25 can detect the light in the environment in order to drive the luminescent panel circuit 25;

the memory 27 connected to the microprocessor 21 is used to save preset parameters.

In accordance with the structure mentioned above, the main unit 1 is connected with the mobile phone 3 while the external dialer 2 is arranged at the location easy-to-reach for users thus the information or phone number that users want to check or transmit is inputting through the keyboard 24 on the external dialer 2. The signals then are sent through the microprocessor 21, the voice-control circuit of hand-free set 11 and finally to the mobile phone 3. Therefore, the dialing process can be initiated through the external dialer 2.

Due to the easy-to-reach feature and larger liquid crystal display 22 on external dialer 2, users are much more convenient to input signals without the trouble of looking for dialing keys.

Moreover, any information the user need can easily be checked because the larger liquid crystal display 22 on the external dialer 2 which is arranged on the location easy to manipulate.

In addition, the photosensitive circuit 26 of the external dialer 2 can detect the light in the environment. If it's too dark, the luminescent panel circuit 25 is triggered by the photosensitive circuit 26 to increase the luminescence of the device so that users can dial or input messages in the dark or gloomy surroundings.

Figure 4:
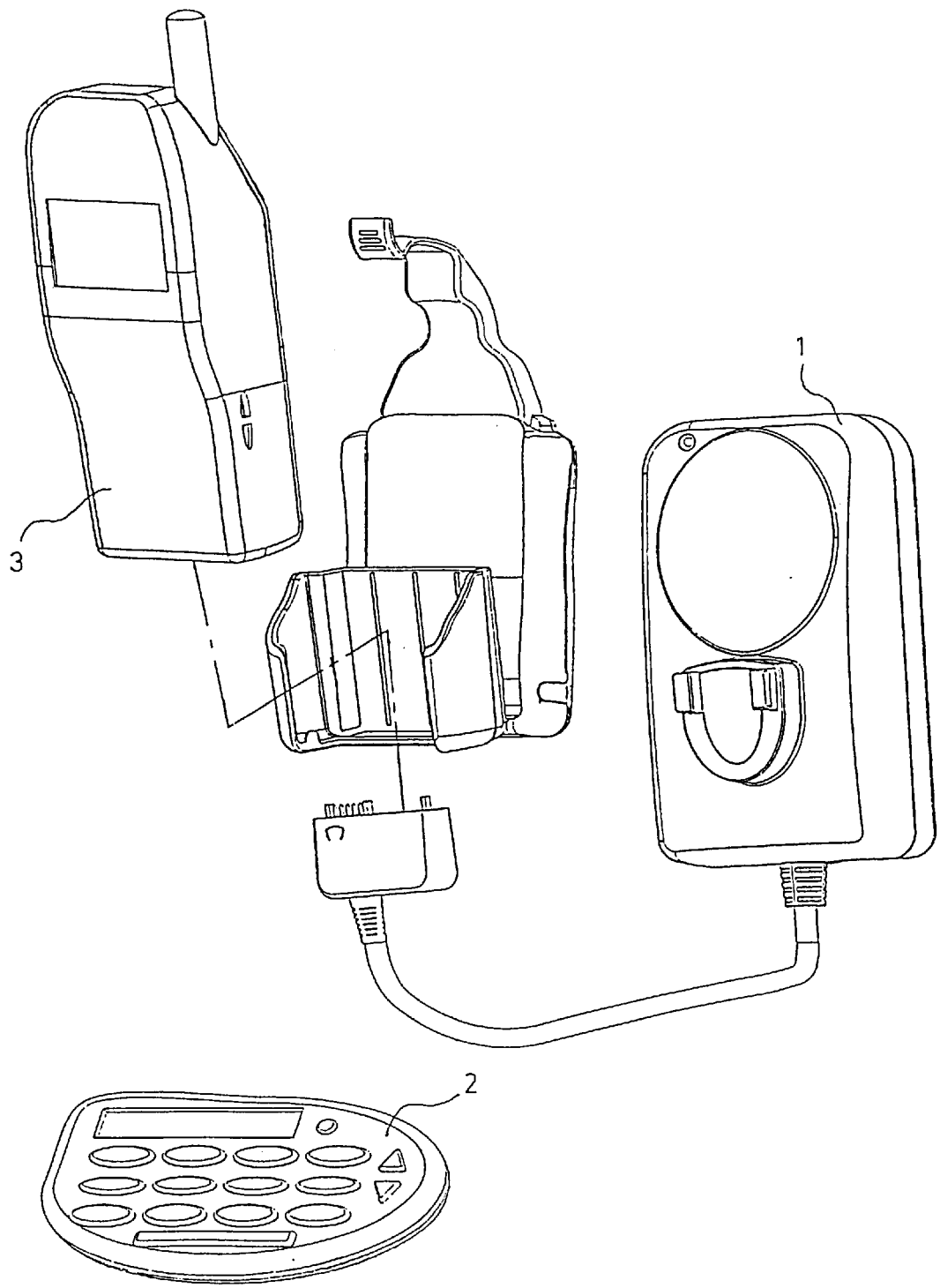
FIG. 4 is another embodiment of the present invention.
Figure 5:
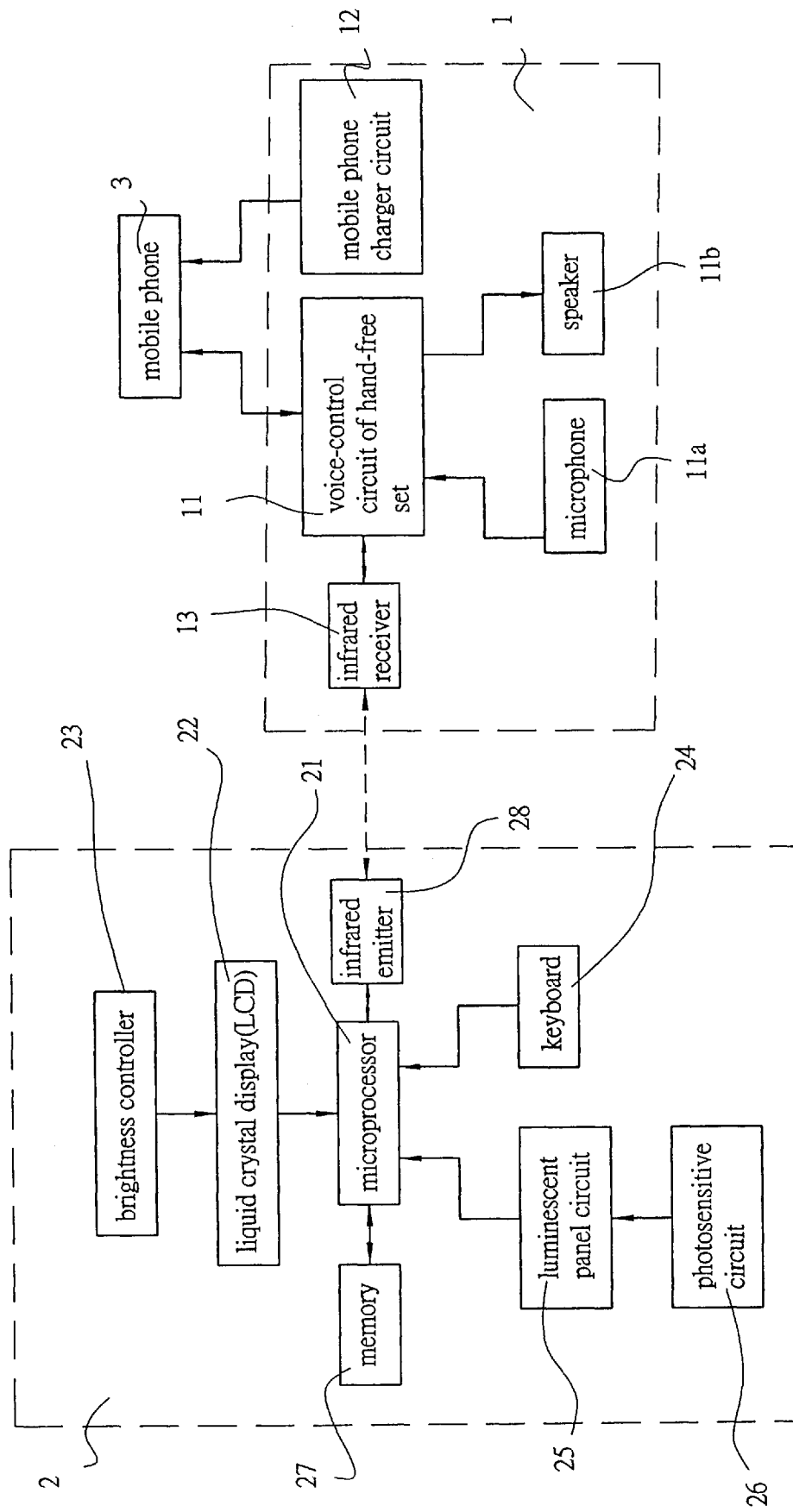
FIG. 5 is a block diagram of circuit in accordance with the present invention in FIG. 4.

Please refer to FIGS. 5 & 4, the main unit 1 includes an IR receiver and the external dialer comprises an IR emitter.

Thus the external dialer 2 is attached to the main unit 1 in wireless way. This is another embodiment of the present invention.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claim.

What is claimed is:

1. A luminescent external dialer for mobile phone primary comprising a main unit connected to a mobile phone and having a voice-control circuit of hand-free set and a mobile phone charger circuit while said voice-control circuit of hand-free set is connected with a microphone as well as a speaker;

an external dialer connected to said voice-control circuit of hand-free set of said main unit 1 and having a microprocessor, a liquid crystal display (LCD), a brightness controller, a keyboard, a luminescent panel circuit, a photosensitive circuit, and a memory, wherein said microprocessor is used to control all circuits;

said LCD for showing signals of incoming call or information is connected to said microprocessor;

said brightness controller for regulating the brightness of said LCD is connected to said LCD;

said keyboard for inputting dial information is connected to said microprocessor and transmitting the information thereto;

said luminescent panel circuit for increasing the brightness when the light in the environment is insufficient is connected to said microprocessor;

said photosensitive circuit connected to said luminescent panel circuit can detect the light in the environment in order to drive said luminescent panel circuit;

said memory connected to said microprocessor is used to save preset parameters.

2. The luminescent external dialer for mobile phone as claimed in claim 1, wherein an infrared receiver is mounted on said main unit while an infrared emitter is disposed on said external dialer so that said external dialer and said main unit is connected with each other in wireless way.

* * * * *